Dec. 6, 1938.  A. J. SCHAMEHORN  2,139,384
RECORDER
Filed June 6, 1934    2 Sheets-Sheet 1

Inventor
A. J. Schamehorn
By Blackburn, Spencer & Flint
Attorneys

Dec. 6, 1938.  A. J. SCHAMEHORN  2,139,384
RECORDER
Filed June 6, 1934   2 Sheets-Sheet 2

Inventor
A. J. Schamehorn
By Blackmore, Spencer & Flick
Attorneys

Patented Dec. 6, 1938

2,139,384

UNITED STATES PATENT OFFICE 2,139,384

RECORDER

Arthur J. Schamehorn, Milford, Mich., assignor to General Motors Corporation, Detroit, Mich., a corporation of Delaware Application June 6, 1934, Serial No. 729,255

3 Claims. (Cl. 234—5.6)

This invention relates to means for obtaining data of the effect of various road shocks upon a passenger in an automotive vehicle as the latter is driven over the road. More specifically it relates to a device for recording on a record sheet the movement of the body of the passenger with respect to the seat of the car.

It is very difficult for a person to compare with any degree of accuracy the riding qualities of different automobiles by merely riding in one and then in another car.

It is therefore the object of this invention to provide a device whereby the passenger will be supplied with an actual record of the vibrations to which he was subjected while riding in a certain car so that he will have concrete evidence of the number of shocks and the amplitude thereof over a certain road and not be obliged to depend upon his personal opinion.

With the above and other objects in view as may hereinafter appear, the invention consists in the features particularly described in the following specification and claims and shown in the drawings; in which Fig. 1 is a side elevation of an automobile with parts of the side broken away to show the device in position.

Figure 1:
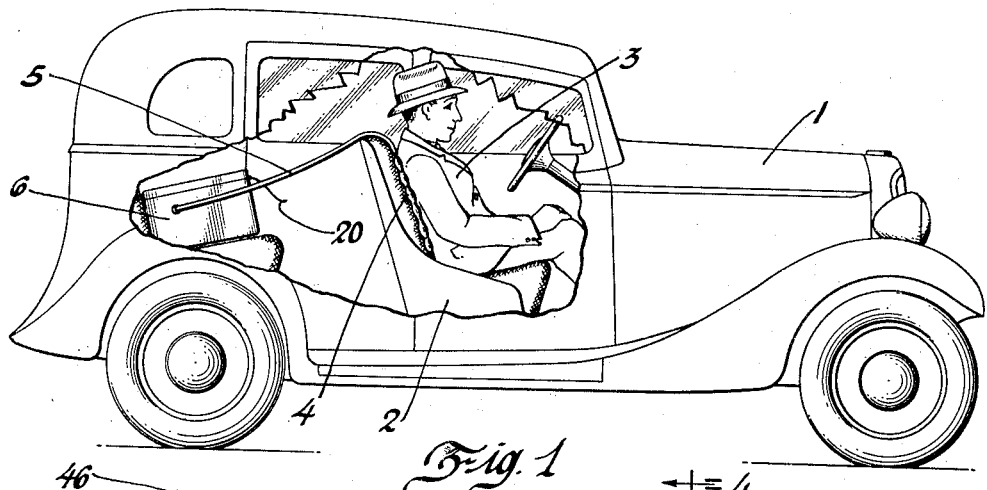
Figure 2:
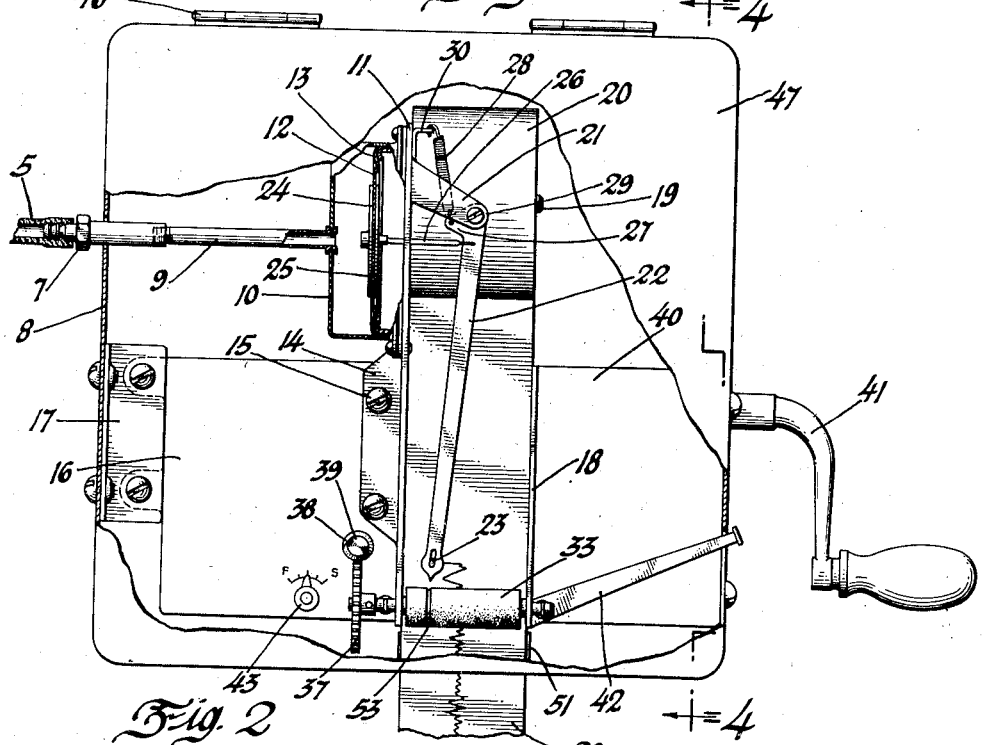
Fig. 2 is a top plan view of the recorder, part of the top being broken away to show details within.
Figure 3:
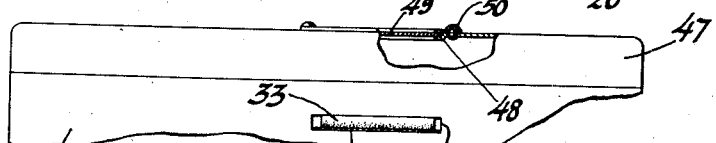
Fig. 3 is a partial front elevation of the recorder with a part thereof in section.

Referring specifically to Fig. 1 a usual form of motor vehicle 1 carries a seat 2 in which the passenger 3 rides. Between the back of the seat 2 and the passenger is placed an inflated rubber sack 4 containing only a low pressure, the exact value of which will be explained more fully at a later point. A hollow flexible tube 5 is connected to the sack 4 to conduct the air therefrom to a recording means indicated broadly at 6 which may be placed at any convenient point, such as the rear seat, as shown.

In the recorder per se, which is shown in Figs. 2-5, the flexible tube 5 is connected to a fitting 7 which projects through the side of the casing 8 of the recorder. The fitting 7 is connected at its inner end to a metal tube 9 which runs to a box or enclosure 10 which is bolted to a frame member 11. Located within the box is diaphragm member 12 which is sealed across the front of the box by a ring 13 thus forming an air tight space within the box.

Figures 4, 5:
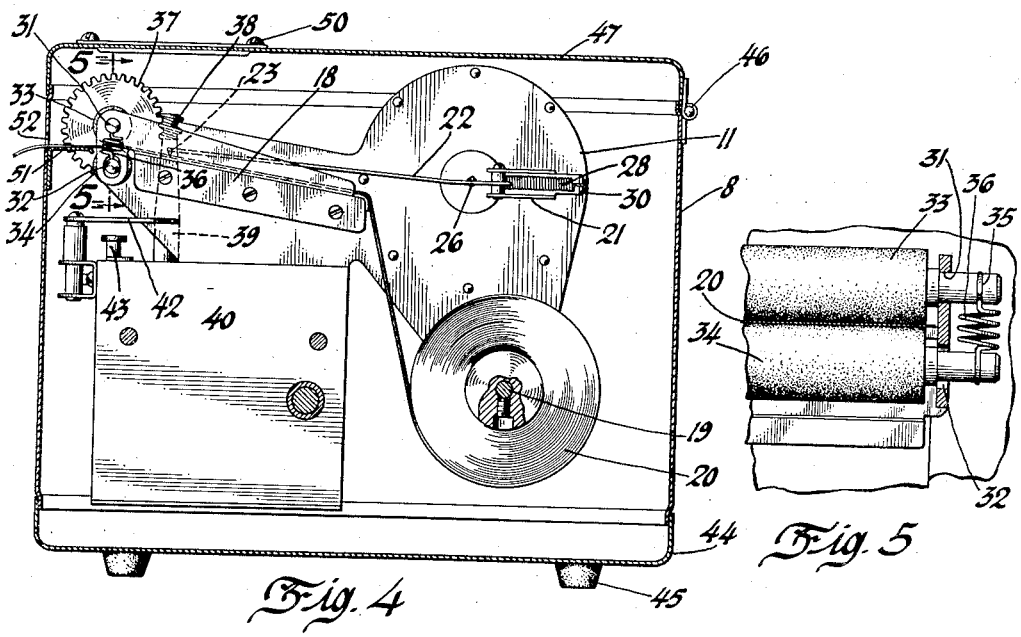
Fig. 4 is a vertical sectional view of the recorder taken on the line 4—4 of Fig. 2.
Fig. 5 is an enlarged detail view of the end of the feeding rolls.

The frame member 11 is placed vertically in the casing 8 and runs from the front to the rear but does not extend to the casing in either direction, its shape being best shown by Fig. 4. Toward the front a flange 14 projects from the member 11. Bolts 15 secure this flange to the outer housing 16 of a spring motor 40 which extends across the casing to the side wall and is secured thereto at its end by means 17. The opposite end of the housing 16 extends beneath the forward end of frame member 11 across to the opposite side and is rigidly secured to the casing 8 by any suitable means. A trough guide or angle side plate 18 for the tape, and slightly wider than the same is supported on the member 11 by a plurality of screws 60 and this acts as a support and guide for the tape.

The frame member 11 supports below the diaphragm a horizontal shaft 19 upon which is held the supply roll of paper tape 20 for the recorder. Also secured to the frame 11 above the roll of tape and to one side of the center of the diaphragm is an arm 21 to which is pivoted at its outer end 29 the recording member 22, which carries the pen point 23 at its extremity.

To the center of the flexible diaphragm 12 are secured two plates 24 and 25, one on each side and are held in engagement with the diaphragm by threaded contact with the stylus bar 26. This bar 26 projects from the outward face of the diaphragm and the extreme opposite end thereof is bent at right angles and hooked into a hole in the recording member 22 just forward of the pivot 29. On the rear portion of the recording member a projecting lug 27 is formed to which is connected one end of a tension spring 28 the other end of the spring being fastened at 30 to the frame member 11. This biases the recording member toward the diaphragm.

The forward portion of the member 11 has two holes drilled therethrough, one above the other, as has the side plate 18, as shown at 31 and 32. The upper two holes are circular and of a size so that the shaft of the rubber roller 33 will fit snugly. Lower holes 32 in the side plates are of oblong shape as shown in both Fig. 4 and Fig. 5, so that there may be some adjustment between the two rollers 33 and 34. The outer end of each of these two rollers is provided with a circular notch 35 around which fit the two hooked ends of tension spring 36 as shown in Fig. 5 the same arrangement being used on the inner end. This keeps a given tension on the rollers at all times.

The end of the shaft of the top roller 33 is extended over housing 16 and gear 37 is secured to the end. This gear meshes with a worm 38 supported on vertical shaft 39 which projects through housing 16 and which is driven by the phonograph motor 40 secured in the housing 16. The phonograph motor 40 has a crank 41 by which the same may be wound, a locking means 42 by which it may be started and stopped and a speed regulator 43.

The bottom of the casing is formed of a separate piece of metal 44 that is firmly secured to the main casing. This section also has attached to it soft rubber feet 45 for supporting the recorder. The top portion 47 is separable from the main casing and is hinged at the back thereto by hinges 46. In this top portion and above the recording pen is an opening 48 in which is secured a glass plate 49 by means 50. This allows one to observe the record as it is made.

The operation of the device is as follows: the paper tape 20 is fed up over the guide member 18, through between the rollers 33 and 34, then over a lip 51 secured to the inside surface of the casing and out through an opening 52 in the front of the casing. Next the rubber sack is inflated and placed in the seat and the passenger places himself in a comfortable position against it, the pressure of air in the sack being such that with the passenger leaning normally against it, the end of the recording member 22 will be opposite the index ring 53 on the top roller 33. The motor is then started and set to the proper speed for feeding the paper, the recorder is placed in the rear of the car and the car started. As the passenger is forced against the back of the seat air will be forced out of the sack and into the box 10 which will force the diaphragm out and this will cause the recording member to move to the right in Fig. 2 and record a shock on the record tape.

Figure 6:
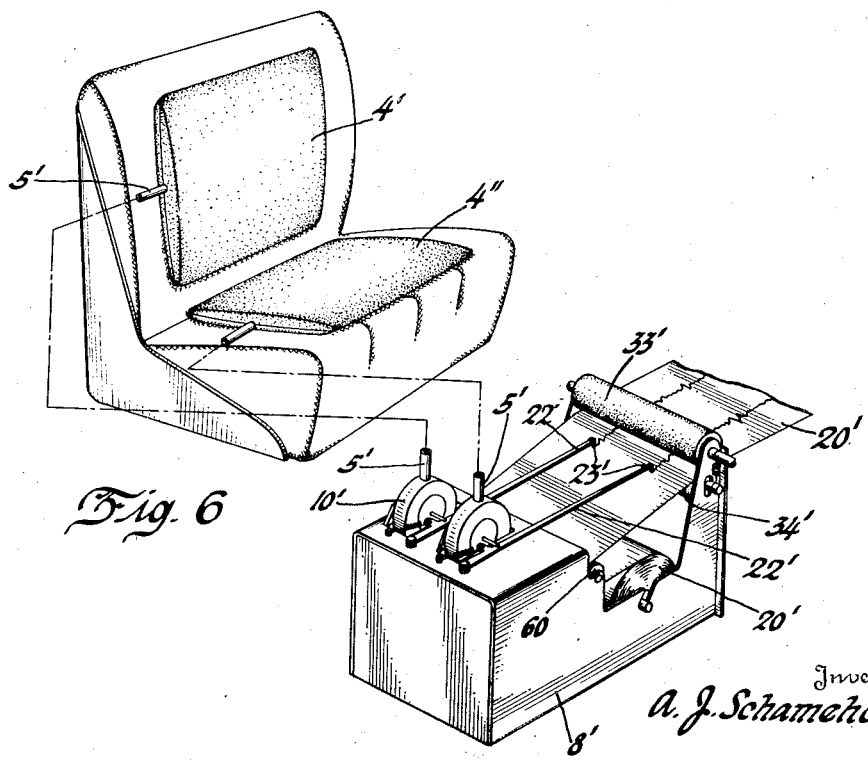
Fig. 6 is a perspective view of a modified form of the invention showing both the recorder and the location of the rubber sacks.

As can be seen from the foregoing, this device will record longitudinal movement of a person against the back of a seat, or in other words the pitch of the car on uneven stretches. In Fig. 6 a modification is shown in which a rubber sack is used upon the seat proper as well as the back and this will record both the longitudinal and vertical shocks and allow a comparison of the two. Rubber sacks 4' and 4" at the back and seat, respectively of the front seat of the vehicle, are connected by rubber tubes 5' to diaphragm units 10' of the same form as previously described. These diaphragm units 10' are mounted side by side on a supporting frame 8' which carries also the paper tape 20' and the two feeding rolls 33' and 34'. Each of the diaphragm units has a recording arm 22' and a pen point 23'. This form includes an additional guide roller 60 to carry the paper beneath the pens. The driving means for the rolls has not been shown in this form as it would be the same as before illustrated. The operation of the device would be the same as that given for the single unit but in this form the right hand pen would record the vertical movements of the passenger, whereas the left hand pen would record, as before, the longitudinal movement. In this manner a composite record may be obtained for comparison of the results in a longitudinal and vertical direction caused by the same bump.

I claim:

1. A device for recording the effect upon the occupant of a vehicle due to road shocks, comprising a yieldable seat-pad adapted to support the occupant, a vibration recording chart and stylus adapted to be carried by said vehicle, and means for transmitting the yielding motion of said seat-pad due to road shocks to said vibration recording chart and stylus.

2. A device for recording the effect upon the occupant of a vehicle due to road shocks, comprising an inflated seat cushion adapted to support the occupant, a pneumatically actuated recorder adapted to be carried by said vehicle, and a conduit in open communication between said cushion and said recorder, whereby are recorded variations of pressure within said cushion caused by transmission of force therethrough to the occupant.

3. A device for recording the effect upon the occupant of a vehicle due to road shocks, comprising an inflated cushion adapted to be placed on the bottom of a seat adapted to support the occupant, an inflated cushion adapted to be placed on the back of said seat, a pneumatically actuated dual recorder adapted to be carried by said vehicle, and a conduit from each of said inflated cushions to a separate part of said dual recorder, whereby are recorded the variations of pressure within said cushions caused by transmission of force therethrough to the occupant due to both jolt and pitch of the vehicle.

ARTHUR J. SCHAMEHORN.